(12) United States Patent
Jordil et al.

(10) Patent No.: US 7,676,942 B2
(45) Date of Patent: Mar. 16, 2010

(54) MULTI-AXIS POSITIONING AND MEASURING SYSTEM AND METHOD OF USING

(75) Inventors: Pascal Jordil, Ecotaux (CH); Siercks Knut, St. Gallen (CH); Bo Pettersson, London (GB); Klaus Schneider, Dornbirn (AT)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 12/047,635

(22) Filed: Mar. 13, 2008

(65) Prior Publication Data

US 2008/0235969 A1    Oct. 2, 2008

(30) Foreign Application Priority Data

Mar. 26, 2007    (EP) .............................. 2007 1 04932

(51) Int. Cl.
*G01B 5/008* (2006.01)
(52) U.S. Cl. .......................................... 33/503; 33/556
(58) Field of Classification Search .................. 33/503, 33/556, 559
See application file for complete search history.

(56) References Cited

U.S. PATENT DOCUMENTS

| 3,869,799 | A |   | 3/1975  | Neuer et al. |
|-----------|---|---|---------|--------------|
| 5,131,166 | A | * | 7/1992  | Weber .......................... 33/503 |
| 5,189,806 | A |   | 3/1993  | McCurtry et al. |
| 5,528,505 | A |   | 6/1996  | Granger |
| 5,996,239 | A | * | 12/1999 | Ohnheiser ..................... 33/503 |
| 6,354,012 | B1|   | 3/2002  | Pettersson |
| 6,370,787 | B1| * | 4/2002  | Kikuchi ........................ 33/503 |
| 2005/0132591 | A1 | * | 6/2005 | Kojima et al. ................. 33/503 |
| 2005/0166413 | A1 |   | 8/2005 | Crampton |
| 2008/0134486 | A1 | * | 6/2008 | Enderle et al. ................ 33/559 |
| 2009/0013547 | A1 | * | 1/2009 | Ferrari et al. ................. 33/503 |

FOREIGN PATENT DOCUMENTS

| DE | 10125813 A1 | 12/2002 |
| EP | 1610087 A1 | 12/2005 |
| EP | 1718924 A2 | 8/2006 |
| WO | 2005071351 A2 | 8/2005 |

OTHER PUBLICATIONS

International Search Report dated Jul. 11, 2007.

\* cited by examiner

*Primary Examiner*—G. Bradley Bennett
(74) *Attorney, Agent, or Firm*—Pearne & Gordon LLP

(57) ABSTRACT

The positioning and measuring system includes a coordinate positioning machine comprising a movable spindle (60) movable relative to a reference surface 30, a rotor (100) rotatably connected with the movable spindle, an actuator (500) for driving the rotor (100) in rotation around a rotation axis (65), and a coordinate probe (150, 190) detachably connectable to the rotor (100) for measuring coordinate of points (350) of a workpiece (200, 201, 250) along a path resulting from the composition of a translation movement of the spindle (60) and a rotation of the rotor (100). The points (350) are offset (r) with respect to the rotation axis (65) of the rotor (100).

12 Claims, 10 Drawing Sheets

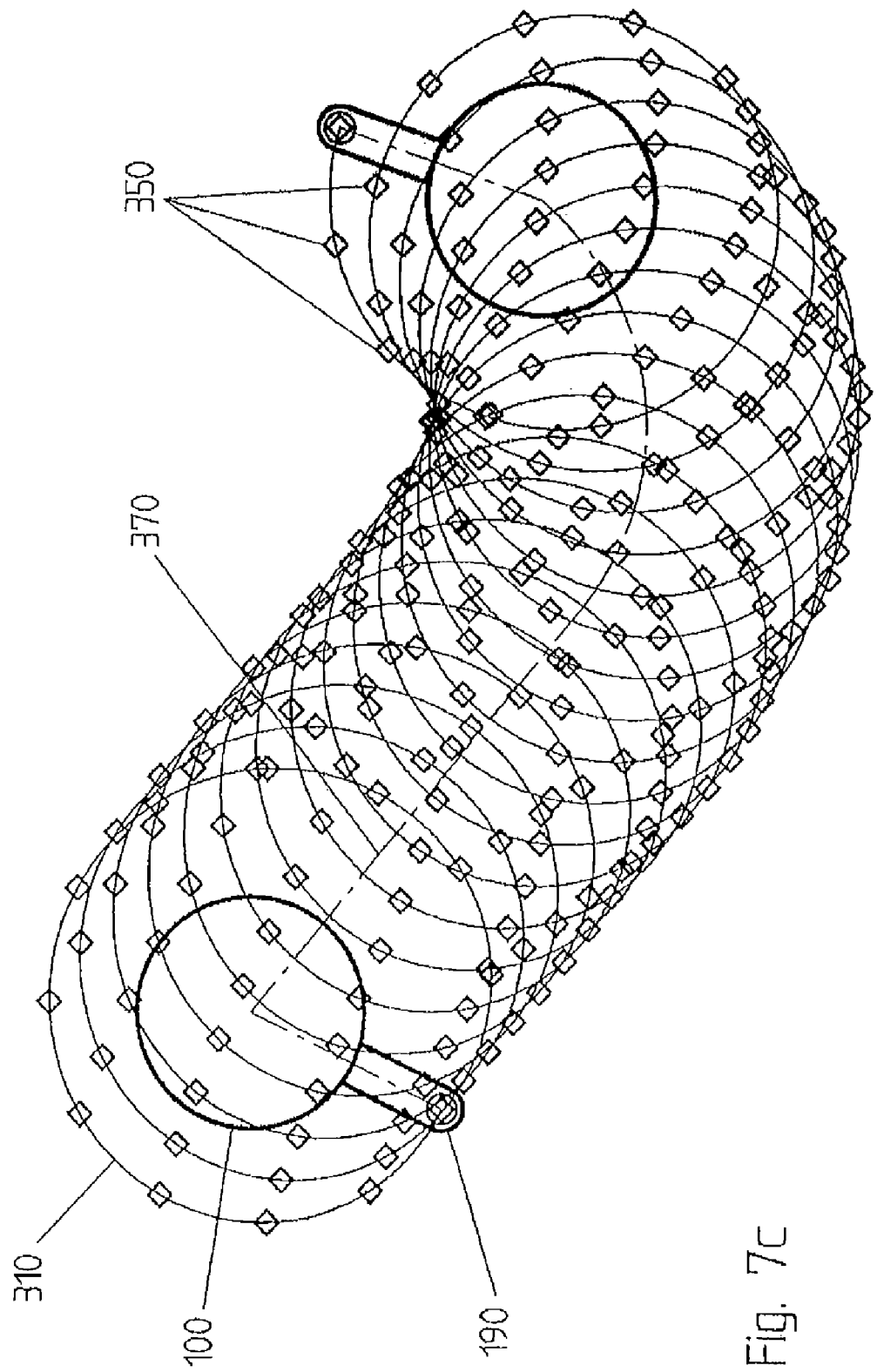

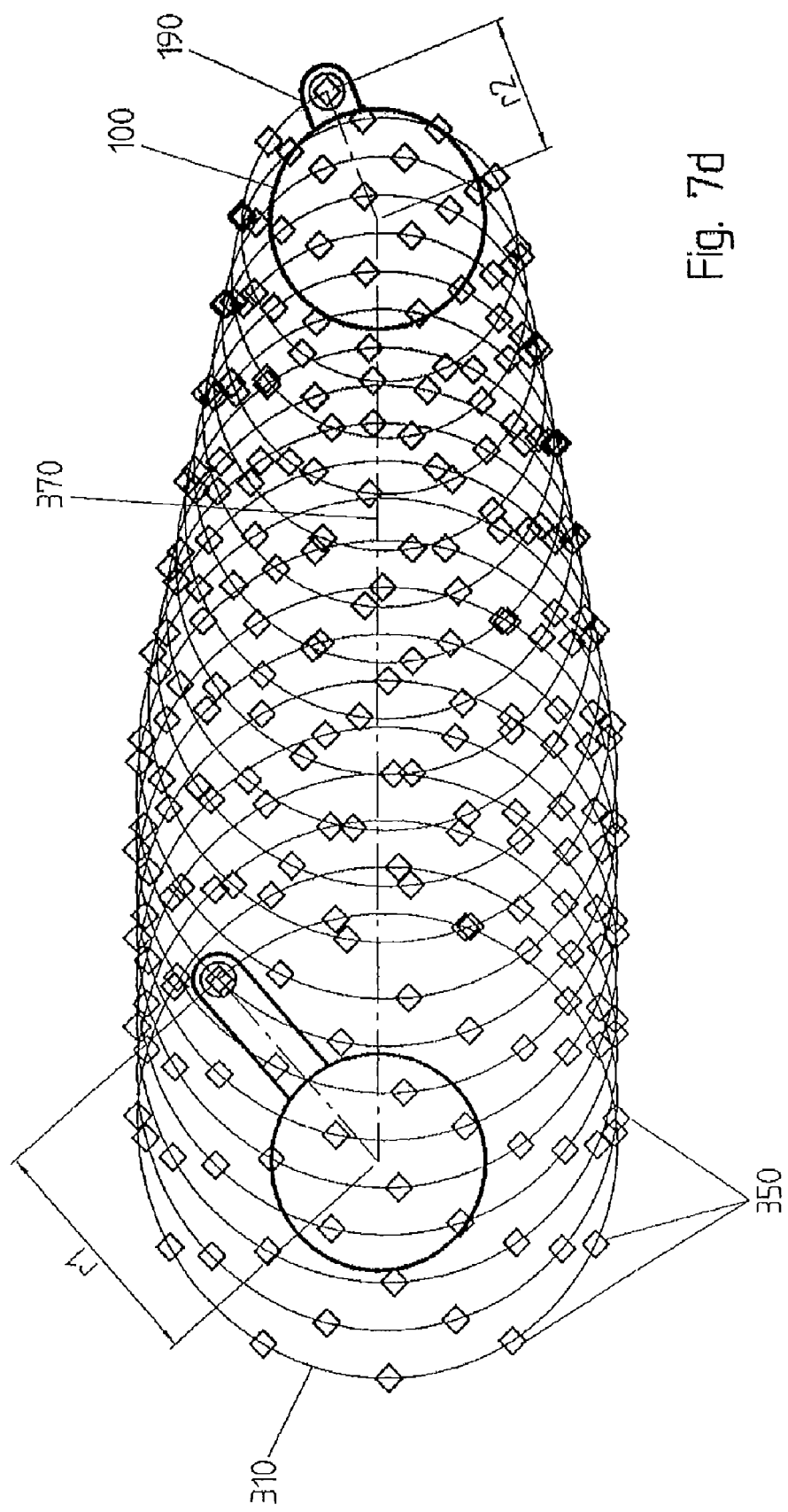

MULTI-AXIS POSITIONING AND MEASURING SYSTEM AND METHOD OF USING

REFERENCE DATA

The present patent application claims priority from European application 2007EP-104932, filed on Mar. 23, 2007

FIELD OF THE INVENTION

The embodiments of the present invention are broadly concerned with coordinate measure machines and methods of using coordinate measure machines. These are devices for dimensional measuring are used to measure coordinates of points on the surface of mechanical elements, by means of an appropriate measuring probe. The measuring probe that may be of contact type, for example a touch probe, or non-contact type, like an optical probe or a laser probe.

DESCRIPTION OF RELATED ART

Coordinate positioning machines, also indicate as coordinate measuring machines, or CMM, generally comprise a fixed reference surface, for example a massive granite table chosen for its high rigidity and dimensional stability, and a kinematics system movable relative to the fixed reference surface and carrying the measuring probe. Examples are known, however, of coordinate measuring machines in which the reference surface is movable, and the measuring probe is fixed.

FIG. 1 represents, in a very simplified fashion, a CMM of known type. The kinematics system takes the shape, for example, of a moving gantry superstructure 40, also called a bridge, movable parallel to one side (X axis) of the reference table 30. The horizontal transverse of the gantry 40 carries a sliding carriage 50 moving along a horizontal direction perpendicular to the X axis (Y axis). The third axis of movement (Z axis) is provided by a vertical spindle 60 which moves up and down relative to the carriage 50. The measuring probe is connected to the end of the spindle 60 and, by the X, Y and Z movement described hereupon, can be freely moved in a three-dimensional measuring volume.

The measuring probe is often a touch probe, having a spring loaded stylus carrying a calibrated ruby ball 120. As the probe touches the surface of the piece 200 to be measured, the X, Y, Z coordinates, obtained by appropriate encoders on the axes, are simultaneously sent to the CMM controller which determines accurately the coordinates of the contact point, by known computing methods. The simpler measuring probes are touch-trigger probe, which determine the instant in time of the contact, as described, for example in EP1610087.

Other probes can determine the amount of deflection of the stylus, for example by an LVDT or strain gauge sensor, and transmit this deflection to the controller, to be integrated in the coordinate calculation. Such probes are termed scanning probes, because they are particularly suitable for scanning measurement in which the probe is in continuous contact with the measured piece. In some cases also simple touch probes are used in continuous scanning mode, or are oscillated to touch the surface of the piece 200 in a number of closed-spaced points (tapping), whose coordinates XYZ are recorded by the controller of the CMM machine.

A class of optical probes that can be used in CMM are micro-imaging digital systems, which are moved like the mechanical measuring probes, and are aimed at the point whose coordinates are to be measured, instead of touching the material, allowing 3-D coordinate measurements.

Laser coordinate probes can likewise be used which are able to determine the coordinate of points on the surface of a measured object as they are illuminated by a scanning laser beam. It is also known, in this class of optical measuring probe, to open the laser in a fan-shaped beam, in order to acquire a large number of points along a laser line, while the line is passed along the piece.

Both imaging probes and laser probes belong to the category of contact-less probes, that is they can provide coordinate of points on the surface under test, without physical contact.

Another kind of known coordinate machines departs from the gantry structure described above, in favor of an articulated-arm kinematics system. Such devices are illustrated, among other, by EP1718924, and comprise, in place of a set of linear axes X, Y, Z, and an articulated arm including a series of rotation joints, fixed at one end, and carrying a coordinate probe, optical or mechanical at the other end. The articulation of the arm allows free movement of the measuring probe in a 3-D measuring volume.

Coordinate measuring systems of the prior art have limitations in the maximum scanning speed that can be achieved, without sacrificing coordinate precision. In particular, at high scanning speed, the vibrations generated by masses in rapid oscillatory movement are a source of measuring errors.

Another limitation of the known coordinate measuring systems is the need for a large selection of probes, having different dimension and sizes, in order to measure complex workpieces. Frequent probe changes slow the measure and reduce the efficiency of the system. Long and massive probes also increase the measuring error and do not tolerate high scanning speeds.

BRIEF SUMMARY OF THE INVENTION

There is therefore a need for a coordinate measuring system which can acquire a large number of coordinate points on a surface of a workpiece, at high speed, and with reduced vibrations and errors. There is also a need of a measuring probe that is adaptable to complex surfaces.

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which:

FIGS. 7a-7e describes possible measuring paths of a scanning operation of a surface according to another aspect of the present invention.

DETAILED DESCRIPTION OF POSSIBLE EMBODIMENTS OF THE INVENTION

Figure 1:
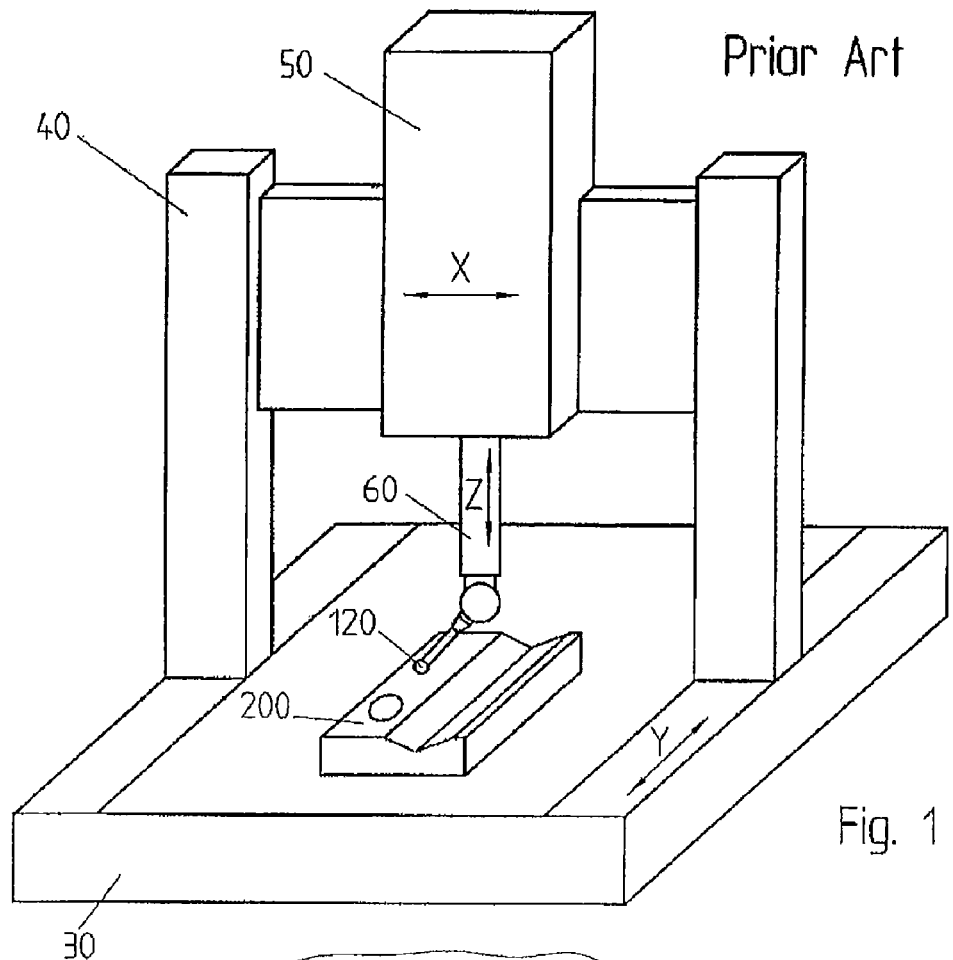
FIG. 1 shows a simplified view of a generic CMM machine of known type.

FIG. 1 shows a contact probe 150 carrying a calibrated ball 120 at the tip of a stylus 123. The contact probe is attached in an offset position to a rotor 100, which is connected to the spindle 60 of the CMM. The rotor 100 can be rotated around the rotation axis 65, parallel to the Z axis of the CMM, by an appropriate actuator, for example an electric motor 500, in the spindle. The angle of rotation of the rotor 100 is encoded by an optical angle transducer, not represented, or by any other appropriate encoder.

In the following, the direction of the "Z" axis will be designated as the vertical direction, and the plane determined by the "X" and "Y" axes, as the horizontal plane, with reference to the conventional orientation of these axes in a coordinate positioning machine. It must be understood, however, that these conventional direction are used for the sake of simplicity only, and do not limit the scope of the present invention, which can be embodied by measuring machines and probes having a generic orientation in space.

The rotor 100 is permanently connected to the spindle 60 of the CMM and is provided with an appropriate connection means to accept a wide selection of probes. In a simple variant, the connection means could consist in a simple threaded hole 106, as drawn. Other type of connection means are however possible, as it is known in the art, and comprised in the scope of the present invention.

Preferably, the actuator 500 is not limited in the angle of rotation. The rotor 100 can describe several revolutions, in both rotation directions.

The touch probe 150 includes a radial arm 149, so as to offset the ball 120 from the rotation axis 65, by a distance r. Thanks to this feature, the touch probe 150 can scan a path on the surface of the piece to be measured, determined by the rotation relative to the vertical axis 65 and, optionally, by movement of the X, Y, Z axes of the CMM.

According to a variant of the invention, the touch probe 150 is sensitive to displacement of the sphere 120 in the vertical direction. In this way, for example, the CMM equipped with the probe of FIG. 2 can be programmed for measuring the profile and the surface quality of a surface along the scanned path.

Figure 3:
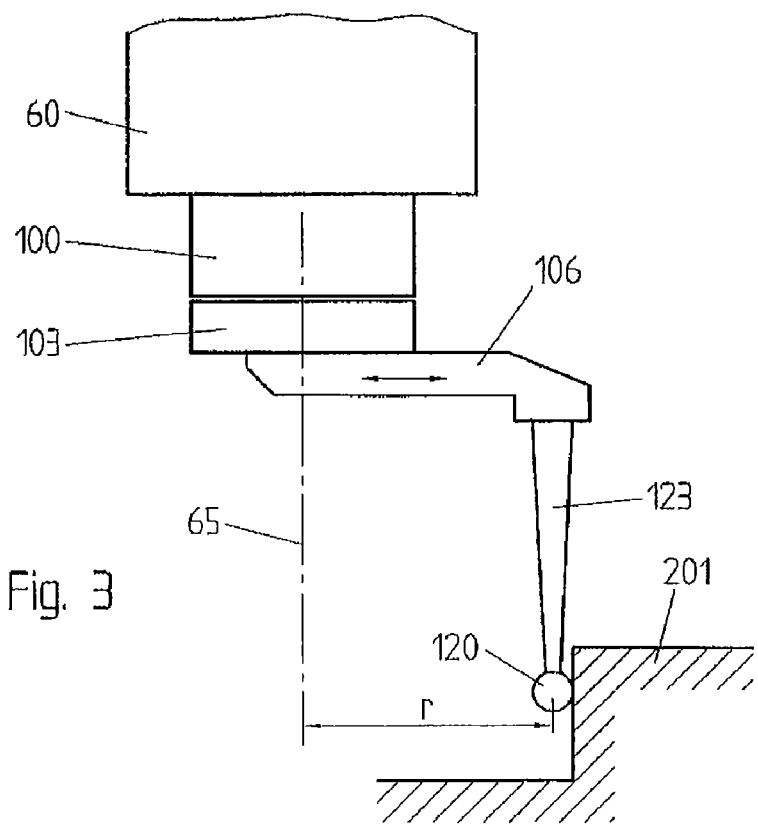
FIG. 3 shows a possible variant of the spindle and probe of the invention.

FIG. 3 shows a variant of a touch probe according to the invention which is sensitive to a deflection of the displacement of the contact point in the horizontal direction. The probe comprises for example a slider 106, which can translate in the horizontal direction, which is the direction orthogonal to the rotation axis 65. The position of the slider 106 with respect to the base 103 of the probe is recorded by an appropriate encoder, not shown, for example a LVDT transducer, or any other appropriate transducer. The horizontal contact force between the sphere 120 and the surface 201 is determined by an appropriate bias means, not shown, as it is known in the art. The probe of FIG. 3 is able to follow a scan path in which the radius "r" of rotation around the axis 65 is not constant, within the limits of displacement of the slider 106.

Figure 4:
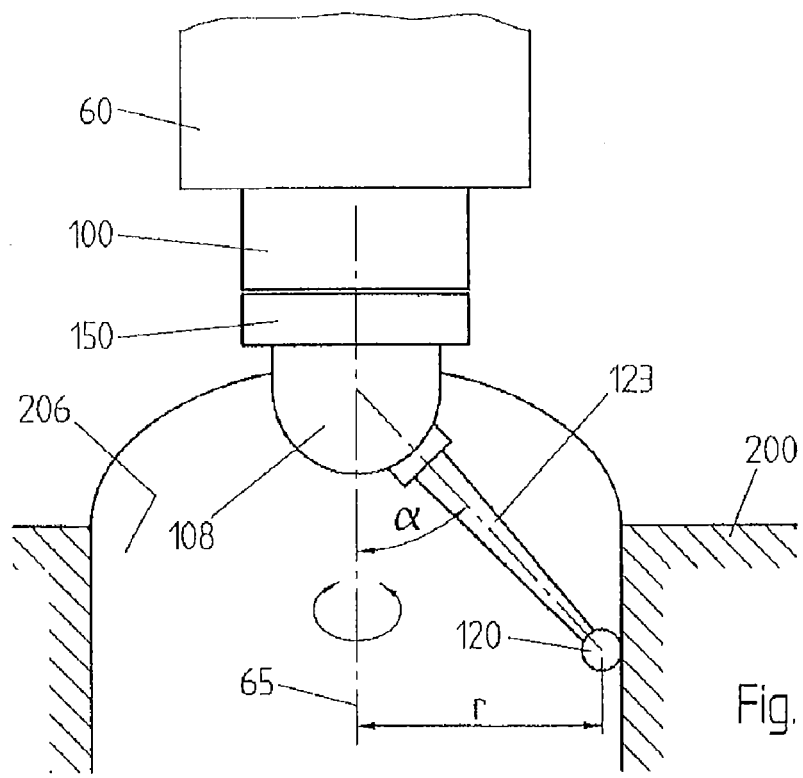
FIG. 4 shows another variant of the probe of a CMM machine according to the present invention.

A further variant of a touch probe according to the invention is shown in FIG. 4. According to this embodiment, the stylus 123 is centrally fixed to the touch probe, and inclined, at an angle α with respect to the vertical rotation axis 65. As a result the measuring point is offset, with respect to the axis 65 by a distance "r". Preferably, the inclination of the stylus can be set at will, by means of an appropriate actuator, not illustrated, in the rotor base 108. In a simplified version, however, the angle of inclination α of the stylus 123 could be determined manually by the operator.

By acting on the value of the inclination angle α and to the length of the stylus 123, the offset radius "r" of the probe of FIG. 4 can be set at will, for example to scan an inner surface 206 of a cylindrical bore, as shown in figure.

The touch probes of the above-described embodiments are preferably deflection-sensitive probes, providing, at each desired moment of time, the deflection of the contact ball 120 relative to a nominal calibration position. The invention comprises the case of a single-axis probe, for example a probe sensitive to the displacement along a vertical-axis, as well as the case of a multi-axis probe, sensible to the three components of the displacements. The touch probe of the invention can comprise all manners of displacement sensors, for example electric, switches, inductive sensors, strain gauges, magnetic or optical displacement sensors.

According to a simplified variant, the probe of the invention only provides an on/off signal in correspondence with a contact between the contact sphere 120 and the surface under measure.

Figure 5:
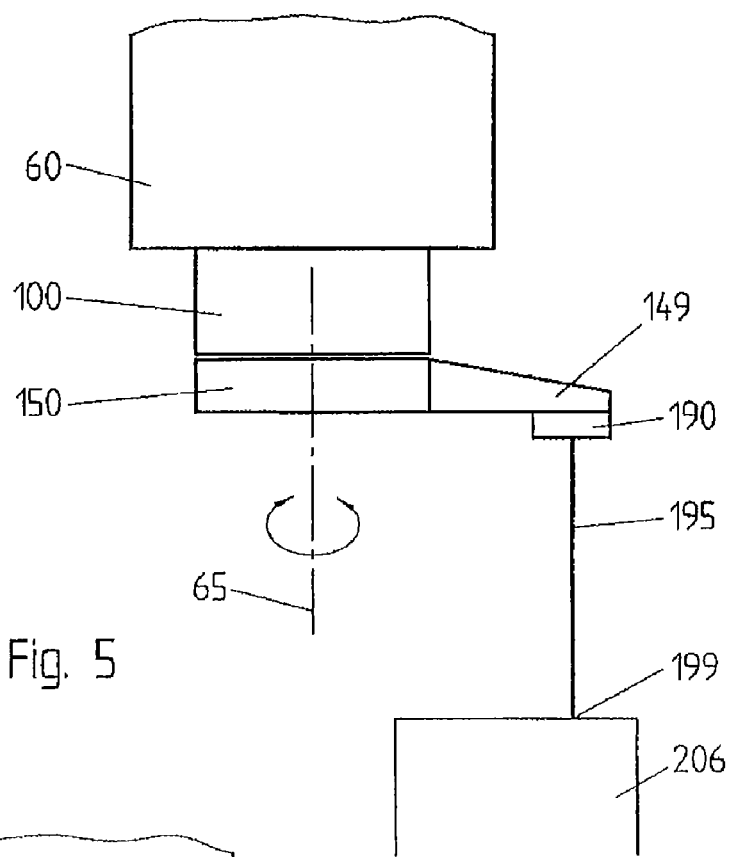
FIGS. 5 and 6 illustrate a variant of the present invention in which the CMM is equipped with contact-less probes.
Figure 6:
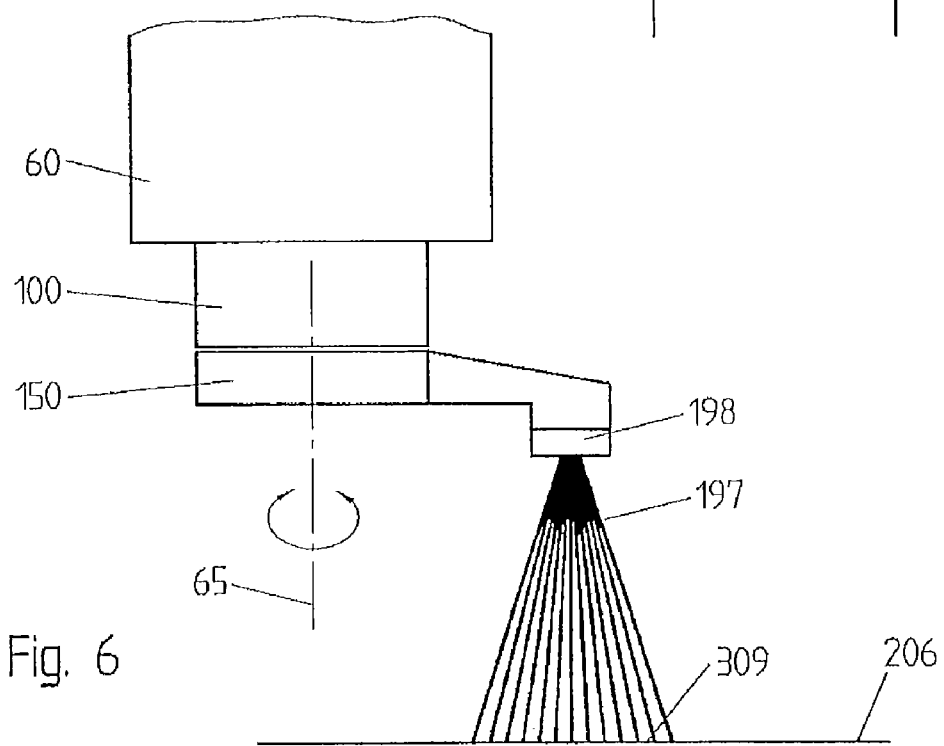

FIG. 5 illustrates a variant of probe equipped with one non-contact measuring head, for example a comprising a laser probe, 190, providing the distance between the probe head and the illuminated point 199 of the surface to be measured, taken along the light beam 195. As specified above, the measuring head 150 is mounted on the rotor 100 of the CMM, which can be selectively driven in rotation around the axis 65, for example coincident with the vertical "Z" coordinate axis. The measured point 199 is offset with respect to the rotation axis 65, by the arm 149. According to a non-represented variant of the invention, the same offset could be obtained by inclining a central laser probe by an angle, in a manner analogous to FIG. 4. FIG. 6 illustrates another variant of the invention including a multi-beam laser probe, or a fan optical probe, providing information on the coordinates of points along an illuminated line 309 on the measured piece 206. According to a further, non represented variant, the multi-beam laser probe could include a plurality of parallel vertical laser beams, (rake probe or comb probe), for example disposed vertically at different offsets from the rotation axis 65.

According to another aspect of the invention, illustrated in FIGS. 7a-7e, a coordinate positioning machine, includes a rotor 100, rotatably attached to the spindle 60 of the CMM, and rotatable, for example, relative to a rotation axis 65 which is parallel to one of the coordinate axes, for example the vertical "Z" axis. The rotor 100 carries a measurement probe, preferably a modular, interchangeable probe 190, arranged to measure coordinates of points which are offset with respect to the rotation axis 65. During the measurement, the rotor 100 is driven in continuous rotation, while the spindle of the machine is translated, according to a predetermined spindle path 370, whereby the probe 190 provides information on the coordinates of a multitude of points 350 on the surface under measurement. The measured points lie on a measuring path 310 resulting from the composition of the motion of the spindle 60 and the rotation of the rotor 100 to which the probe 190 is connected.

Figure 7A:
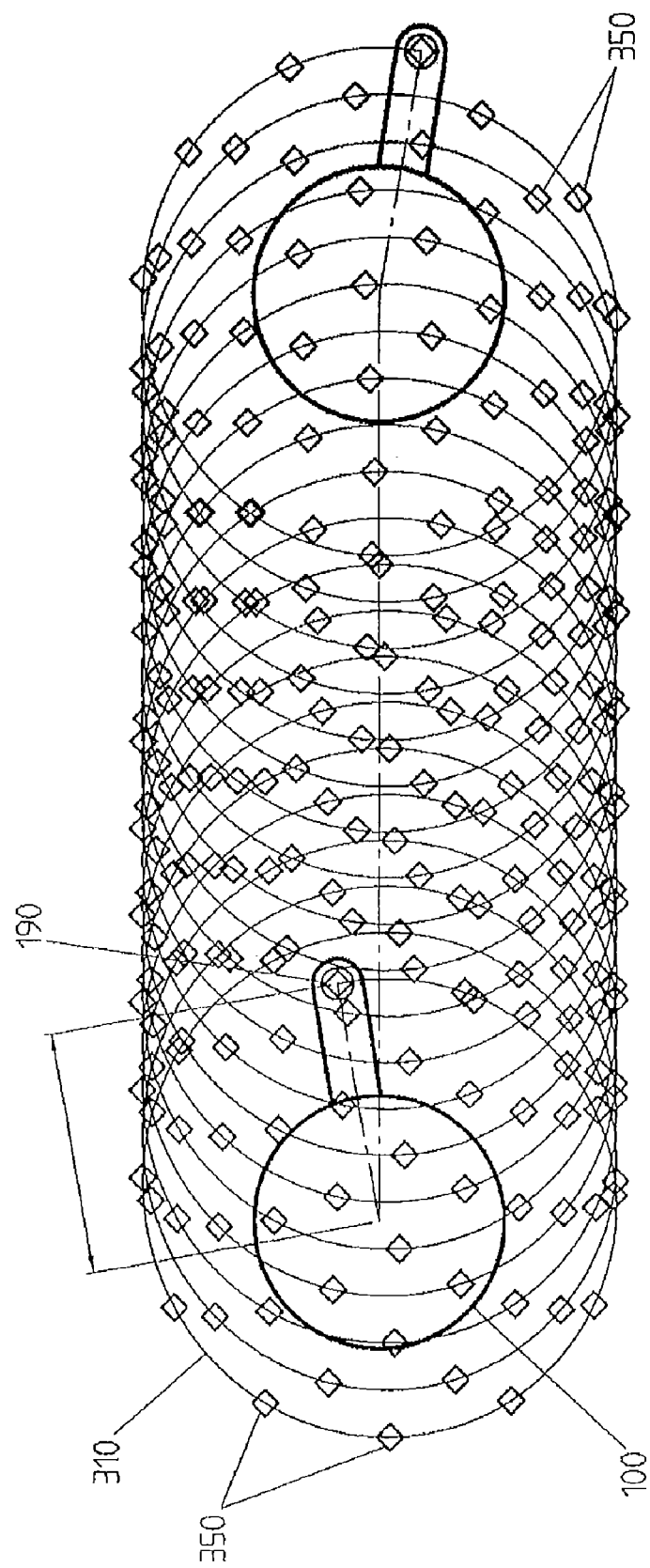
Figure 7B:
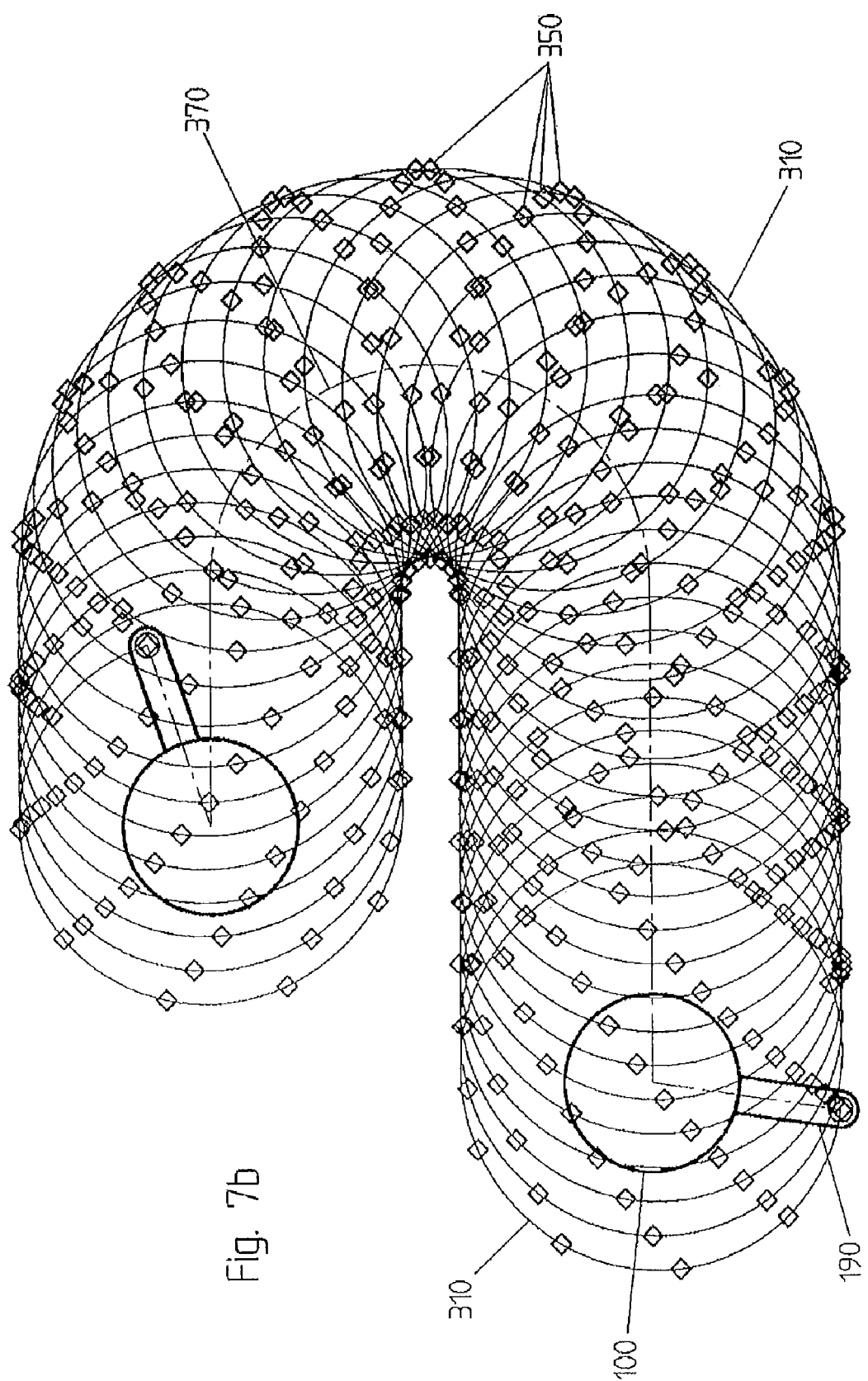

FIG. 7a, in particular, is a view from below of the measuring path 310 resulting form the composition of a uniform linear motion of the spindle and a constant uniform rotation of the rotor 100. In such case the measuring path is a trochoid curve. FIGS. 7b and 7c show the resulting measuring path 310 in two cases of non-uniform motion of the spindle 60 whereby the measuring path deviates from the trochoidal figure.

Figure 7E:
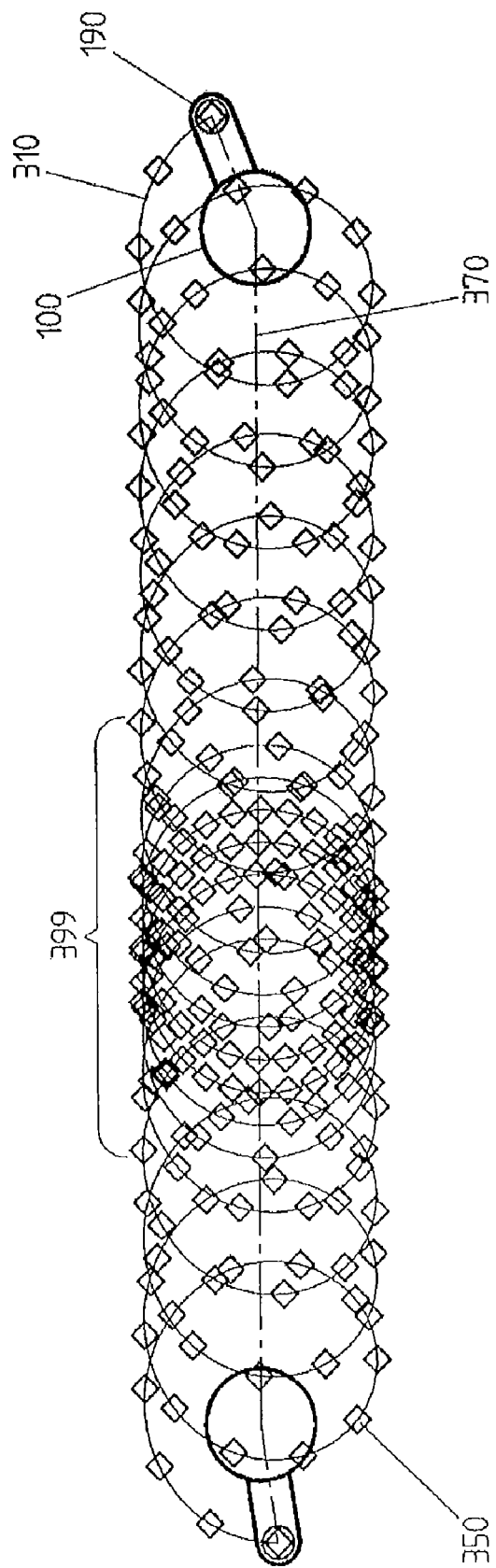

FIG. 7d illustrates the case in which the radius of rotation of the measured point is not constant, but changes between a value r1 and a value r2 as the scanning proceeds. This variation presupposes that the probe 190 comprises an actuator for setting the offset between the measure point and the rotation axis 65. This could be accomplished, among others, by the probes illustrated in FIG. 3 or 4, or by any other appropriate actuator, as it is known in the art. FIG. 7e shows the case in which the angular velocity of the rotor 100 of the spindle and the linear speed of the spindle 60 are not constant, but are varied along the path, while the measure points 350 are sampled at a constant rate. In particular the rotation and translation speed of the probe 190 are lower in region 399 than elsewhere, with the result that region 399 is sampled more finely than other parts of the scanned surface.

In a general case, the measuring path is determined according to the circumstances of the surface to be measured, and will comprise trochoidal sections, corresponding to an uniform motion of the spindle 60 and an uniform rotation speed of the rotor 100, as well as sections in which the measure path has a different shape. In general the measuring path may comprise, in combination and according to the needs, any combination of rectilinear and curvilinear movements of the spindle, together with uniform or non-uniform rotation of the rotor 100, and variations of the probe radius "r".

Figure 2:
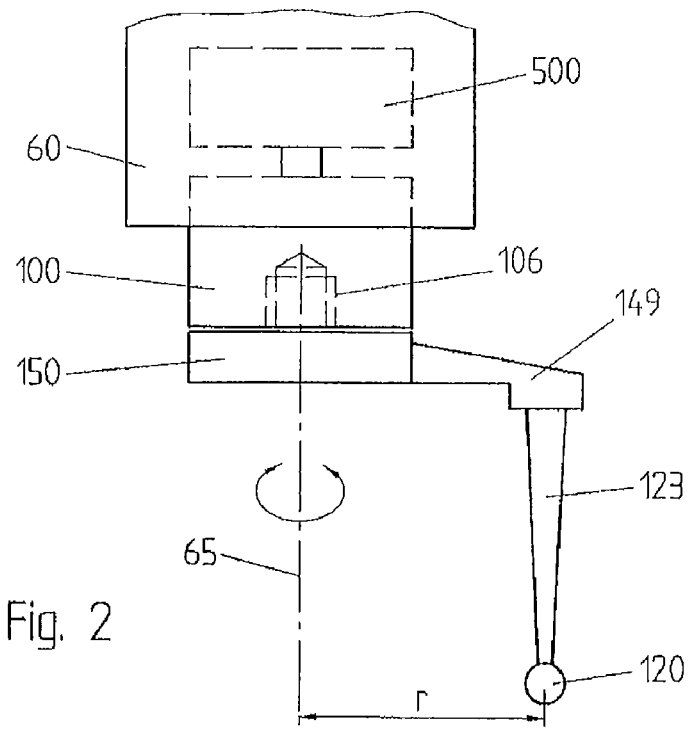
FIG. 2 illustrates the spindle and the measuring probe of a CMM according to one aspect of the present invention.

The probe 190 can be any known measuring probe including, but not exclusively, a touch probe or a deflection-sensitive probe, similar to those illustrated in FIGS. 2 and 3, or an inclined stylus probe as shown in FIG. 4, or any kind of non-contact probe, either of the single-point type, as in FIG. 5, or of the multi-point type or line type, for example a fan probe conform to FIG. 6. Other kind of optical probes, for example micro-imaging systems, are likewise possible. Preferably, the rotor 200 comprises a standardised adapter on which any element from a selection of modular probes can be fitted, including contact probes and contact-less probes of different dimensions and characteristics, to be chosen according to the circumstances.

The combination of a translation of the spindle 65 with a continuous rotation of the rotor 100 provides a fast scanning speed with a minimal amount of vibrations. If needed, the mass of the eccentric arm and probe 190 can be equilibrated by appropriate counterweights in the rotor 100, to further reduce the vibration level.

Figure 8:
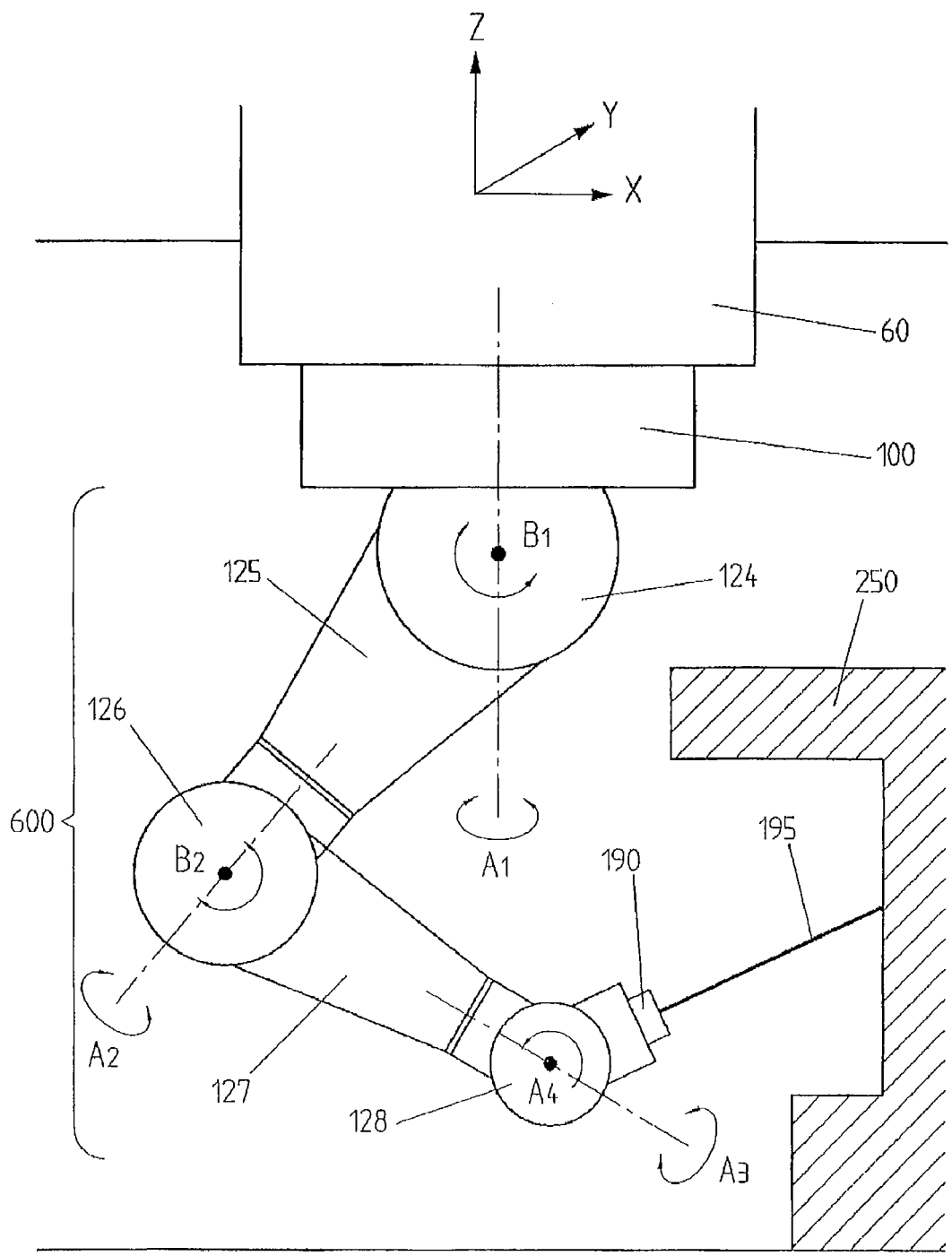
FIGS. 8 and 9 show schematically a probe with multiple articulated joints, according to another aspect of the invention.

FIG. 8 represents another aspect of the present invention concerning a multi-joint probe 600 and a coordinate measuring machine.

The coordinate positioning machine, partly illustrated in FIG. 8, comprises a movable spindle 60, which can be translated according to at least three independent axes, for example three orthogonal coordinate axes XYZ, as it is known in the art. The rotor 100 is rotatably connected to the spindle 60, in a manner as to be able to rotate around a rotation axis A1, for example a vertical rotation axis parallel to the "Z" coordinate axis. The rotation means used to actuate the rotor 100 are analogous to those already mentioned in connection with FIG. 2 and will not be further described here.

The multi-joint probe 600 comprises a chain of rotation joints 124, 126 and 128 linked by rigid elements 125, 127. Preferably each joint comprises two independent orthogonal rotation axes, A, which can be set in rotation by appropriate actuators, for example electric motors, under the control of the CMM controller. The rotation angles of the joint are also read by appropriate encoders, for example optical encoders, and the encoded values are made available to the CMM controller, which can then compute, at each moment, the position and orientation of the coordinate probe 190.

Figure 9:
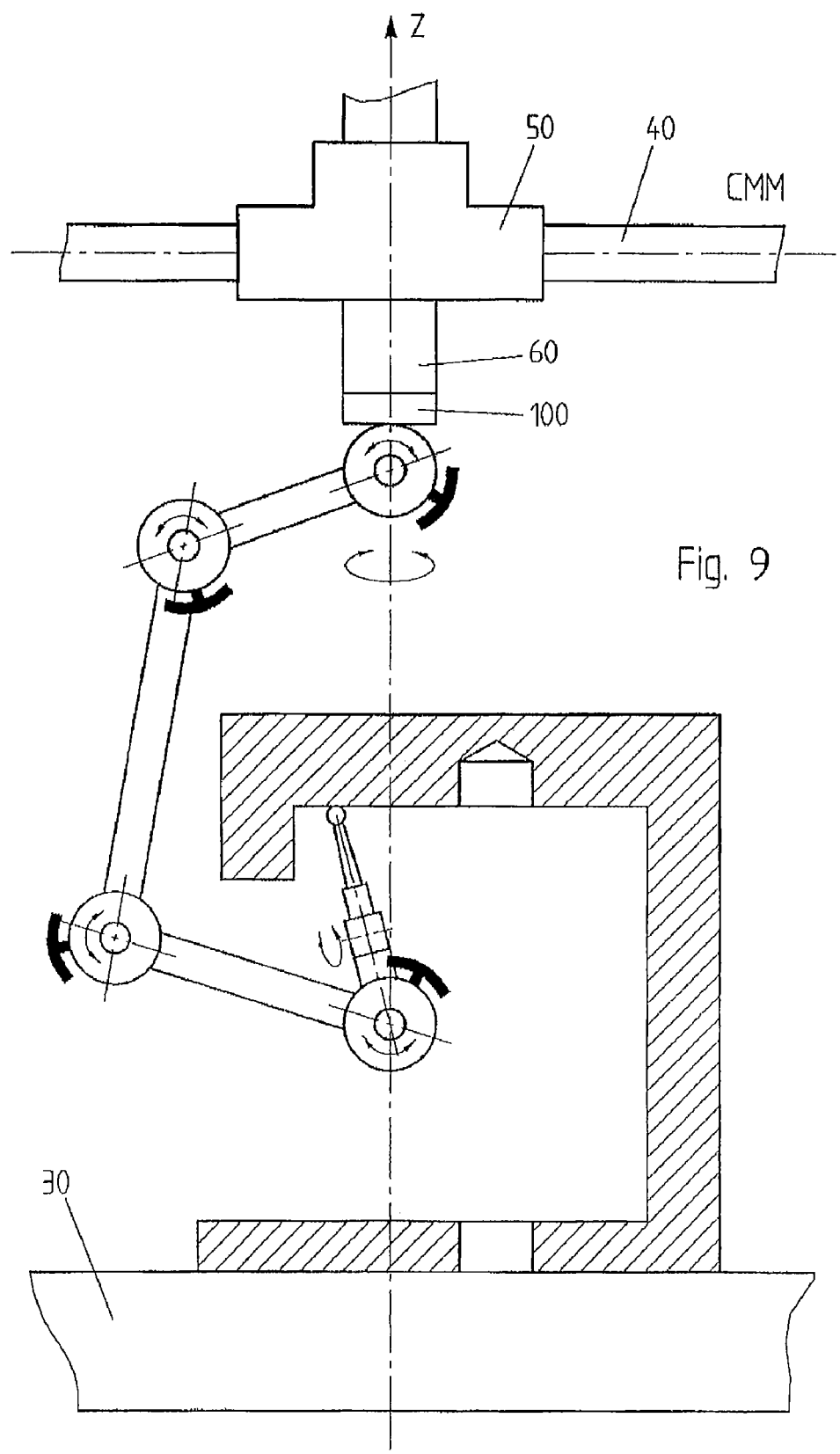

According to a separate and independent aspect of the invention, the present invention relates also to a coordinate positioning machine including a movable carriage 60, for example according to three linear Cartesian axes XYZ, which carries and a multi-articulated arm including a chain of motorized rotation joint linked by rigid elements, as shown in FIGS. 8 and 9. Each of the rotation joints 124, 126, 128 include a programmable actuator, for orienting the joint according to a desired angle, and an angle encoder, by whose output the position and orientation of the coordinate probe 190 can be precisely determined and known at any time.

According to this aspect of the invention, the coordinate positioning system of the invention can make, under the control of a digital controller suitably programmed (not represented), precise measurement of complex workpieces, by combining the motion of the carriage 60 and of the multilink arm, in order to adapt to a multiplicity of situations.

In the represented example, the first rotation joint comprise only one horizontal rotation axis B1, the vertical rotation around the A1 axis being already provided by rotor 100. The other joints 126 and 128 comprise two orthogonal axes each. It is to be understood that the present invention is not limited to a specific number of joints and rotation axes, but comprises articulated multi-joint probes having any number of degrees of freedom, in combination with those provided by the CMM machine. The present invention comprises also a multi-joint probe connectable to a spindle of a CMM machine.

Advantageously one or more rotation axes, for examples axes A1, A2, A3, allow unbounded rotation for any number of revolutions and can be driven continuously, in order to provide a trochoidal scanning path, as seen above, or a path resulting by the combination of several rotations around different axes and translations of the spindle. Advantageously with a view to reducing inertia moments and masses, the coordinate probe 190 is a non-contact probe, for example a single-point laser probe, as drawn, or a multi-point laser scanner. In alternative a standard touch probe can also be employed. Preferably, the multi-joint coordinate probe 600 comprises a standardised adapter on which can any element from a selection of modular probes be fitted, including contact probes and contactless probes of different dimension and characteristics, to be chosen according to the circumstances.

The invention claimed is:

1. A positioning and measuring system including
a coordinate positioning machine comprising a movable spindle movable relative to a reference surface, a rotor rotatably connected with the movable spindle, an actuator for driving the rotor in rotation around a rotation axis,
a coordinate probe detachably connectable to the rotor for measuring coordinates of points of a workpiece along a path resulting from the composition of a translation movement of the spindle and a continuous rotation of the rotor,
characterized in that
the points are offset with respect to the rotation axis of the rotor.

2. The system of claim 1, wherein the coordinate probe is detachably connectable to the rotor, the connection position being offset with respect to the rotation axis.

3. The system of claim 1, further comprising actuator means for changing the offset between the measured point and the rotation axis of the rotor.

4. The system of claim 1, wherein the coordinate probe is an optical contact-less probe.

5. The system of claim 1, wherein the actuator can drive the rotor in constant rotation for several revolutions.

6. The system of claim 1, wherein the coordinate probe comprises a chain of rotation joints linked by rigid arms.

7. The system of claim 6, wherein each joint comprises one joint rotation axis or more than one joint rotation axes, and one or more than one actuator, for driving the joint rotation axes in rotation.

8. The system of claim 7, wherein each joint comprise encoding means, for reading the rotation angles of the joint rotation axes.

9. The system of claim 4, wherein the coordinate probe is a laser scanning probe or a multi-beam laser probe, or a fan laser probe.

10. A method of scanning a surface of a workpiece with a measuring system, the system comprising
- a movable spindle movable relative to a reference surface, a rotor rotatably connected with the movable spindle, an actuator for driving the rotor in rotation around a rotation axis,
- a coordinate probe detachably connectable to the rotor for measuring coordinates of points of a workpiece along a measurement path resulting from the composition of a translation movement of the spindle and a continuous rotation of the rotor, wherein the points are offset with respect to the rotation axis of the rotor, the method comprising the steps of:

operating the movable spindle along a spindle path operating the actuator to drive the rotor in rotation at a predetermined angular velocity, measuring, at predetermined time intervals, a) the position of the spindle along the path b) the angle of rotation of the rotor c) the output of the coordinate probe determining, from the output of measures a), b), c), the coordinates of points on the surface of the workpiece, along the measurement path.

11. A computer program product, loadable in the program memory of a controller of a coordinate positioning machine, comprising software elements for executing the method of claim 10 when executed by said controller.

12. A coordinate positioning machine comprising a movable spindle movable relative to a reference surface, a rotor rotatably connected with the movable spindle, an actuator for driving the rotor in rotation around a rotation axis,
- a coordinate probe detachably connectable to the rotor for measuring coordinate of points of a workpiece along a path resulting from the composition of a translation movement of the spindle and a rotation of the rotor, further comprising a digital controller comprising a program memory, programmed in order to execute the method of claim 10.

* * * * *